Figure 1:
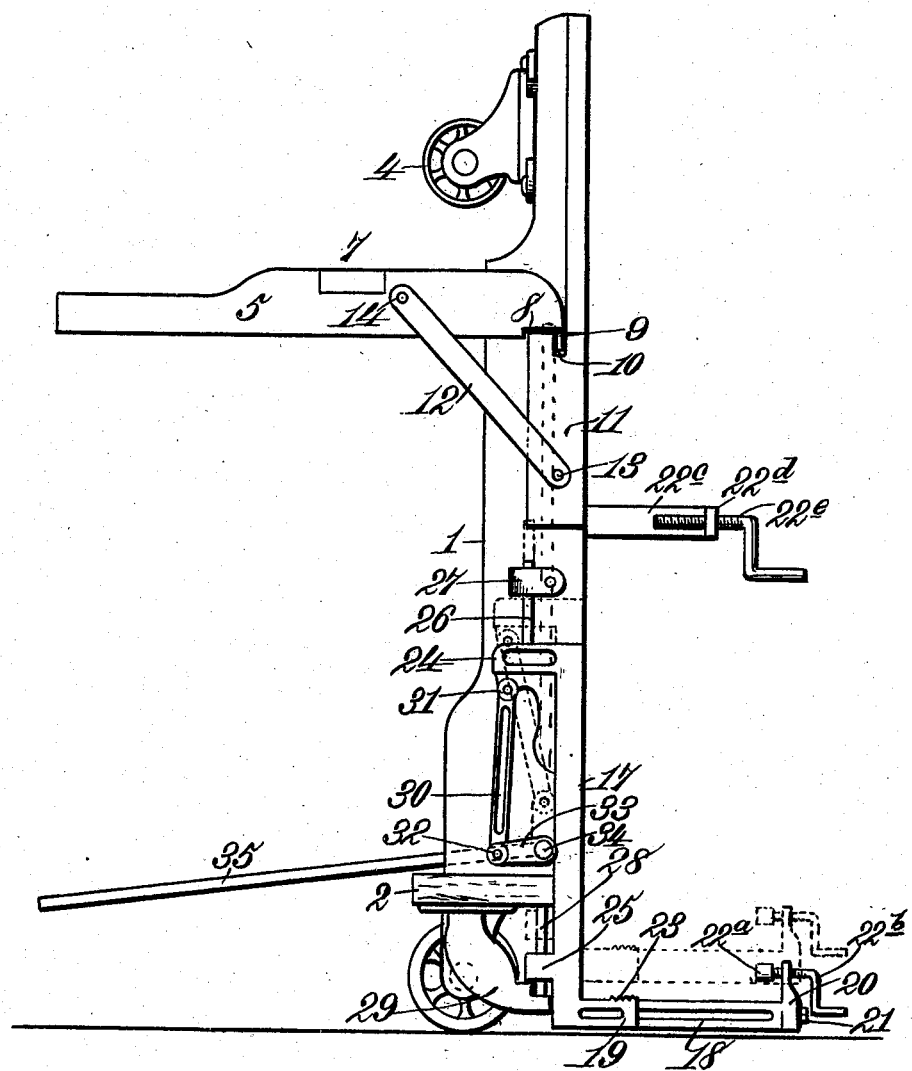

No. 867,099. PATENTED SEPT. 24, 1907.
S. BILGER.
PORTABLE PIANO TRUCK.
APPLICATION FILED SEPT. 12, 1906.

2 SHEETS—SHEET 1.

Witnesses.
Inventor.
Samuel Bilger.
By James L. Norris.
Atty.

No. 867,099. PATENTED SEPT. 24, 1907.
S. BILGER.
PORTABLE PIANO TRUCK.
APPLICATION FILED SEPT. 12, 1906.
2 SHEETS—SHEET 2.
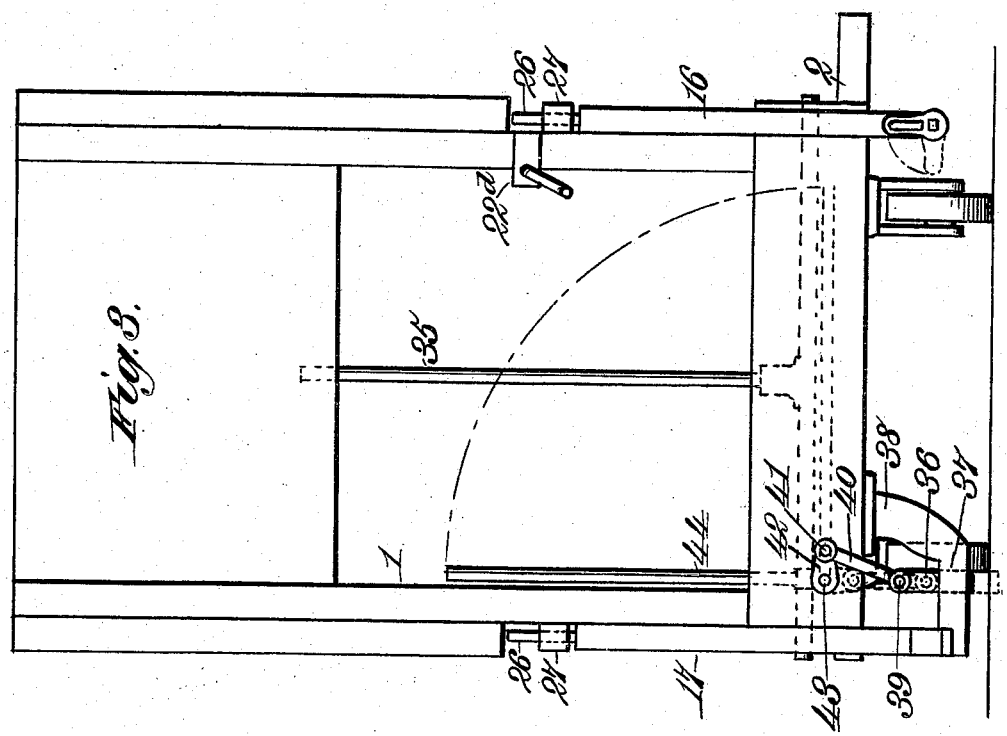
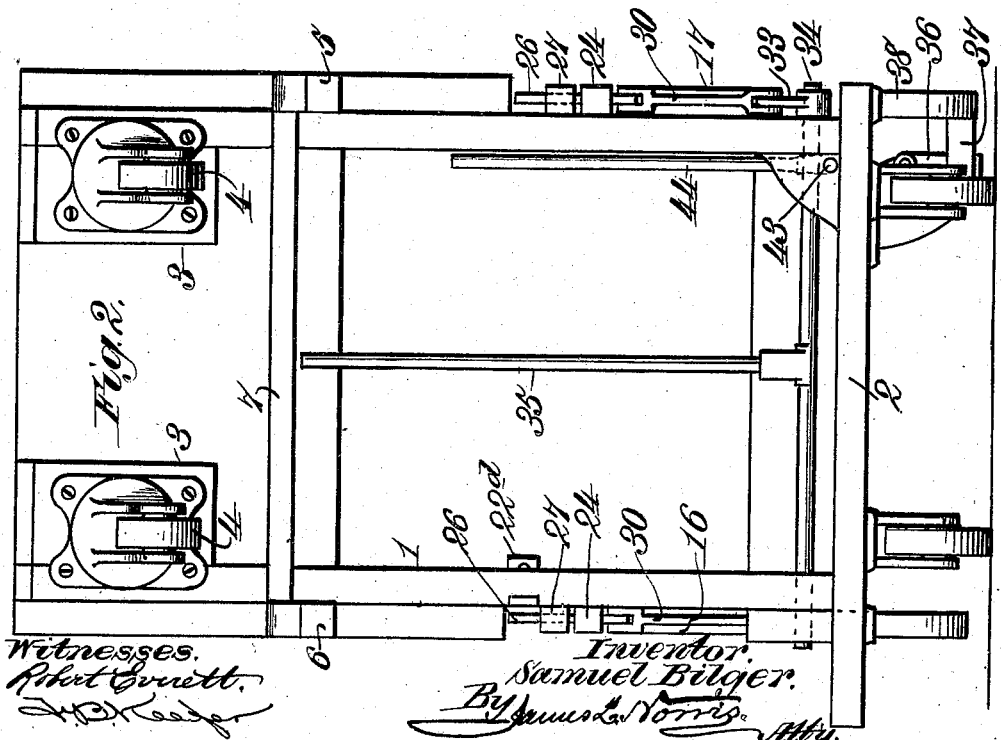

UNITED STATES PATENT OFFICE.

SAMUEL BILGER, OF SILVERDALE, PENNSYLVANIA.

PORTABLE PIANO-TRUCK.

No. 867,099.     Specification of Letters Patent.     Patented Sept. 24, 1907.

Application filed September 12, 1906. Serial No. 334,291.

*To all whom it may concern:*

Be it known that I, SAMUEL BILGER, a citizen of the United States, residing at Silverdale, in the county of Bucks and State of Pennsylvania, have invented new and useful Improvements in Portable Piano-Trucks, of which the following is a specification.

This invention relates to improvements in portable piano trucks, and aims to provide a truck in a manner as hereinafter set forth which will facilitate the handling of pianos or cabinet organs of any size—whether the instrument be unboxed or in boxed condition in a wareroom, show-room or freight office; or while the instrument is being moved into a dwelling or building, or when the instrument is transported from room to room, or when hoisting as well as loading or unloading the instrument; and furthermore when carrying the instrument up or down a stairway.

The invention further aims to provide a truck with means to prevent shifting thereof when occasion requires as for example, when the truck with the instrument attached has been loaded upon a vehicle, said means preventing the truck with the instrument from shifting upon the vehicle bottom during the travel of the vehicle, thereby preventing the instrument from becoming injured.

The invention further aims to provide the truck with means to facilitate the moving of the truck with the instrument attached, around a box hall or short turn.

The invention further aims to provide a portable piano truck which when transporting the instrument will not mar or damage the latter as the instrument does not have to be handled when upon the truck; a truck that is light in weight and simple in its construction so as to be easily and quickly handled and operated; a truck that is inexpensive in cost to manufacture and although intended and designed for service in connection with musical instruments, particularly pianos and cabinet organs, it can be also used in the transportation and moving of boxes and other large bodies generally.
With the foregoing and other objects in view, the invention consists of the novel construction, combination and arrangement of parts hereinafter more specifically described and illustrated in the accompanying drawings, wherein is shown the preferred embodiment of the invention; but it is to be understood that changes, variations and modifications can be resorted to which come within the scope of the claims hereunto appended.

In describing the invention in detail, reference is had to the accompanying drawings, in which:

Figure 1 is a side elevation of one of the sections of the truck; Fig. 2 a rear elevation, and Fig. 3 a front elevation.

A portable piano or cabinet organ truck in accordance with this invention comprises two sections. As each of these sections is of the same construction, only one is shown. When the truck is in operative position, one section is connected to one end of the instrument and the other section is connected to the other end of the instrument; the instrument is then raised and transported upon the truck to the point desired. It is thought unnecessary to show both sections of the truck as a description of one applies to the other.

Each of the truck sections comprises a vertically-extending body portion 1, constructed of any suitable material and may be of any height desired and is secured to a platform 2, the latter projecting forwardly from the body portion 1, but flush with the inner face of said body portion 1. Carried by each of the body portions 1 near the top thereof is a pair of blocks 3, to each of which is attached a caster wheel 4. These caster wheels are adapted to facilitate the moving of the truck around a box hall or short turn when necessary to turn the piano on its end pairs. Each of the body portions 1 is furthermore provided with a pair of drop handles indicated by the reference characters 5, 6. These handles are connected together by a cross-bar 7 and have their inner ends cut away, as at 8, forming a lug 9, which is adapted to seat in a recess 10 formed in a block 11. When the lug 9 is seated in the recess 10, the inner end of the handle straddles the upper portion of the block 11, and the handle is retained in such position through the medium of a link 12 pivoted at one end, as at 13, to the block 11 and at its other end, as at 14, to the handle. There is a block 11 secured to each side of the body portion 1 and a link 12 for each handle. It is evident from such construction that when the lugs 9 are moved out of the recesses 10, the links 12 will fall, and consequently will lower the handles 5, 6. To the platform 2 is secured a pair of caster wheels upon which the truck section travels.

The truck section is provided with a mechanism for lifting the instrument off the floor or elevating the instrument so that during the transporting of the instrument, the instrument will not come in contact with the floor and retard the travel of the truck. The said means is arranged at each side of the body portion 1 and projects away from the inner face of said body portion 1, and said means consists of a pair of L-shaped brackets 16, 17, the horizontally-extending arm 18 of the bracket 16 being longer than the horizontally-extending arm 19 of the bracket 17. The arm 18 of the bracket 16 carries a pivoted clamping member 20 which consists of an arm loosely mounted upon the shaft 21 and carrying at its upper end an adjustable clamping bar provided with a head 22ª, adapted to engage the instrument. The bar extends through a screw-threaded opening in the member 20, said bar being screw-threaded so as to engage the screw-threaded wall of the opening in the member 20, and said bar is furthermore provided with a handle 22ᵇ. The truck section is furthermore provided with a means for clamping the instrument and said means consists of a supporting bar 22ᶜ, projecting inwardly from one side of the truck section and having an angularly-disposed free end 22ᵈ, through which extends a screw-threaded clamping bar 22ᵉ.

The supporting bar 22ᶜ is so shaped that it will fit around the first post, termed "pilaster", in the back of the instrument, and, in connection with the bar 22ᵉ, will securely clamp the instrument to the truck section.

The arm 19 of the bracket 17 has its upper face serrated as at 23, so as to prevent the same slipping when in carrying position. When the sections of the truck oppose each other, the bracket 16 of one section is arranged diametrically opposite with respect to the bracket of the other section, and a like arrangement is had in connection with the bracket 17 of one section with respect to the bracket 17 of the other section. The brackets 16, 17 are vertically adjustable so as to lift the instrument off the floor and the brackets 17 are adapted to clamp the instrument to the truck sections so there will be no danger of the instrument slipping off the truck sections during the travel of the truck, or rather, the transporting of the instrument by the truck. The brackets 16 and 17 are connected to the body portion 1, and said connecting means also acts as a guide consisting of a pair of lugs 24 and 25, the lug 24 being formed integral with the bracket at the top thereof and extending towards the outer face of the body portion, and the lug 25 being formed integral with the bracket near the bottom thereof and extending in the same direction as the lug 24. Secured to the lug 24 and extending in a vertical manner, is a combined guide and connecting rod 26, which travels through a keeper 27 fixed to the side of the body portion 1. The lug 25 is adapted to surround the combined guide and connecting rod 28, which at its upper end is fixed to the base 2 and at its lower end secured to a supporting member 29 fixedly secured to the base 2 and depending therefrom. There is a rod 26 and a rod 28 for each of the brackets, and there is a keeper 27 for each of the rods 28. A toggle mechanism is provided for each of the brackets 16 and 17, said toggle mechanism being adapted when operated in one direction to elevate the brackets, and when operated in the opposite direction to lower the brackets. Each of the toggle mechanisms consists of an elongated lever 30 articulated at one end, as at 31, to the lug 24 and pivotally connected at its other end, as at 32, to the outer end of a short lever arm 33, the other end of said lever arm 33 being fixed to a rock-shaft 34, said shaft 34 being mounted in suitable bearings at the front of the body-portion 1 near the bottom thereof and extends the entire width of said body-portion so that both lever arms 33 can be mounted upon said shaft 34. The shaft 34 is rocked through the medium of a lever arm 35 which is secured centrally of said shaft. From such construction of toggle mechanisms it is evident that when the arm 35 is raised to a position to extend in parallelism with respect to the outer face of the body-portion 1, the toggle mechanisms will assume the position shown in dotted lines in Fig. 1 and elevate the brackets 17 and 18 to the position shown in dotted lines in Fig. 1, and when such movement is had, the instrument being connected to and supported by said brackets, it is evident that the instrument will be elevated off the floor or ground. When the lever-arm 35 is moved to the position shown in full lines in Fig. 1, the brackets will be caused to assume their lowermost position shown in full lines in Fig. 1.

The means to prevent the shifting of the truck when the instrument has been connected thereto, consists of a vertically-movable combined elevating and arresting arm 36 which operates through a guide member 37 carried by a hanger 38 fixed to the platform 2. The arm 36 is arranged at the front and at the bottom of the body-portion 1 and is articulated at its upper end, as at 39, to the lower end of a lever-arm 40, the upper end of said arm 40 being pivoted, as at 41, to one end of a short lever-arm 42, the other end of said arm 42 being fixed to a rock-shaft 43 journaled in the body-portion and extending in an opposite direction with respect to the direction in which the shaft 34 extends. A lever-arm 44 is connected with the shaft 43 for rocking it. When the lever-arm 44 is in the position shown in full lines in Fig. 3, the arm 26 is in its elevated position, but when the lever-arm 44 is moved to the position shown in dotted lines in Fig. 3, the arm 36 is moved to its lowermost position as shown in dotted lines, in Fig. 3, and when moved to such position, its action will be such as to elevate the section of the truck carried by said arm 36. The length of the arm 36 is such that when moved to operative position, that is to say, the position to prevent the shifting of the truck, it will elevate the caster-wheels off the floor so that movement of the truck will be prevented. When the sections of the truck are set up, the position of the means on one section to prevent the movement of the truck is arranged diametrically opposite with respect to the means for arresting the movement of the truck on the other section. By employing the means in a manner as stated, the truck can be moved square off the floor so that it will not tilt.

The manner of using the truck is as follows: It will be assumed that the arm 20 of the bracket 17 is in the position shown in dotted lines in Fig. 3; the truck-sections are then moved against the ends of the instrument and the horizontally-extending arms of the brackets 16 and 17 pass below the bottom of the instrument, the arm 19 extending a short distance across the bottom of one end wall of the instrument, and the arm 18 extending the entire distance across the bottom of same end wall of the instrument; after the truck sections have been brought to such position, the arm 20 is then moved to a vertical position and the adjusting clamping screw screwed home to fixedly secure the piano to the brackets 17; the lever 35 of each section is then moved to the position shown in dotted lines in Fig. 1, which elevates the instrument off the floor, and the weight of the instrument then tends to keep the lever 35 in the position to which it has been moved; the instrument is then transported to the desired point and removed from the truck. If during the transporting of the instrument it is desired to prevent the movement of the truck temporarily for some cause or another, the lever arm 44 of each section is then moved to the position shown in dotted lines in Fig. 3, and the elevating and arresting arm 36 caused to move to the position shown in dotted lines in Fig. 3. This will elevate the truck and prevent further movement thereof. Before the instrument is transported from one point to another it is also clamped through the medium of the bars 22c and 22e in a manner as heretofore stated.

Having thus fully described my invention, what I claim as new and desire to secure by Letters Patent, is:

1. A portable truck for the purpose set forth comprising two vertically-extending portable sections, each of which is provided with a pair of combined supporting and elevating brackets, the lower end of one of the brackets being shorter than the lower end of the other of the brackets, said bracket having the elongated end provided with a clamping means, and an elevating and lowering means for each of the brackets.

2. A portable truck for the purpose set forth, comprising two vertically-extending portable sections, each of which is provided with a pair of combined supporting and elevating brackets, the lower end of one of the brackets being shorter than the lower end of the other of the brackets, said bracket having the elongated end provided with a clamping means, an elevating and lowering means for each of the brackets, and a combined elevating and arresting means for each of said sections.

3. A portable truck for the purpose set forth, comprising two vertically-extending portable sections, each of which is provided with a pair of combined supporting and elevating brackets, the lower end of one of the brackets being shorter than the lower end of the other of the brackets, said bracket having the elongated end provided with a clamping means, an elevating and lowering means for each of the brackets, a pair of caster wheels carried by each of the sections near the top thereof, and a handle for each of the sections.

4. A portable truck for the purpose set forth, comprising two vertically-extending portable sections, each of which is provided with a pair of combined supporting and elevating brackets, the lower end of one of the brackets being shorter than the lower end of the other of the brackets, said bracket having the elongated end provided with a clamping means, an elevating and lowering means for each of the brackets, a combined elevating and arresting means for each of said sections, a pair of caster-wheels carried by each of the sections near the top thereof, and a handle for each of the sections.

5. A piano truck comprising in its construction a vertically-extending portable section, said section provided with a pair of combined supporting and elevating brackets, the lower end of one of the brakets being shorter than the lower end of the other of the brackets, said bracket having the elongated end provided with a clamping means, and an elevating and lowering means for each of the brackets.

6. A piano truck comprising in its construction a vertically-extending portable section, said section provided with a pair of combined supporting and elevating brackets, the lower end of one of the brackets being shorter than the lower end of the other of the brackets, said bracket having the elongated end provided with a clamping means, an elevating and lowering means for each of the brackets, and a combined elevating and arresting means for said section.

7. A piano truck comprising in its construction a vertically-extending portable section, said section provided with a pair of combined supporting and elevating brackets, the lower end of one of the brackets being shorter than the lower end of the other of the brackets, said bracket having the elongated end provided with a clamping means, an elevating and lowering means for each of the brackets, a pair of caster-wheels carried by said section near the top thereof, and a handle for said section.

8. A piano truck comprising in its construction a vertically-extending portable section, said section provided with a pair of combined supporting and elevating brackets, the lower end of one of the brackets being shorter than the lower end of the other of the brackets, said bracket having the elongated end provided with a clamping means, an elevating and lowering means for each of the brackets, a combined elevating and arresting means for said section, a pair of caster-wheels carried by said section near the top thereof, and a handle for said section.

9. A portable truck for the purpose set forth, comprising two vertically-extending portable sections, each of which is provided with a pair of combined supporting and elevating brackets, the lower end of one of the brackets being shorter than the lower end of the other of the brackets, said bracket having the elongated end provided with a clamping means, an elevating and lowering means for each of the brackets, and a drop-handle for one of said sections.

10. A portable truck for the purpose set forth, comprising a pair of vertically-extending portable sections, each of said sections provided with a pair of vertically-movable combined elevating and supporting brackets slidably connected to each of the sections and substantially L-shaped in contour, the horizontally-extending arm of one of said brackets being longer than the horizontally-extending arm of the other of said brackets and carrying a clamping means, a pair of toggle mechanisms suitably connected together and with said pair of brackets for elevating and lowering them, and a single lever-arm for operating said pair of toggle mechanisms.

11. A portable truck for the purpose set forth, comprising a pair of vertically-extending portable sections, each of said sections provided with a pair of vertically-movable combined elevating and supporting brackets slidably connected to each of the sections and substantially L-shaped in contour, the horizontally-extending arm of one of said brackets being longer than the horizontally-extending arm of the other of said brackets and carrying a clamping means, a pair of toggle mechanisms suitably connected together and with said pair of brackets for elevating and lowering them, a single lever-arm for operating said pair of toggle mechanisms, each of said sections further provided with a vertically-movable combined elevating and arresting arm, and mechanism for elevating said arm.

12. A portable truck for the purpose set forth, comprising a pair of vertically-extending portable sections, each of said sections provided with a pair of vertically-movable combined elevating and supporting brackets slidably connected to each of the sections and substantially L-shaped in contour, the horizontally-extending arm of one of said brackets being longer than the horizontally-extending arm of the other of said brackets and carrying a clamping means, a pair of toggle mechanisms suitably connected together and with said pair of brackets for elevating and lowering them, a single lever-arm for operating said pair of toggle mechanisms, each of said sections further provided with a vertically-movable combined elevating and arresting arm, mechanism for elevating said arm, and each of said sections further provided with a pair of caster-wheels near the top thereof, and a handle arranged below the caster-wheels.

13. A piano truck comprising in its construction a vertically-extending portable section, said section having a pair of combined supporting and elevating brackets, the lower end of one of the brackets being shorter than the lower end of the other of the brackets, said bracket having an elongated end provided with a clamping means, an elevating and lowering means for each of the brackets, a supporting bar carried by the sections, and a clamping bar extending through said supporting bar.

In testimony whereof I have hereunto set my hand in presence of two subscribing witnesses.

SAMUEL BILGER.

Witnesses:
HARRY E. GRIM,
THEO. FANDHARDT.